United States Patent [19]
Elting

[11] 4,057,683
[45] Nov. 8, 1977

[54] GRAFT COPOLYMER AND PROCESS FOR MAKING SAME

[75] Inventor: Katherine Anne Cline Elting, Houston, Tex.

[73] Assignee: Milchem Incorporated, Houston, Tex.

[21] Appl. No.: 667,176

[22] Filed: Mar. 15, 1976

[51] Int. Cl.$^2$ .................. C08F 289/00; C08L 55/00
[52] U.S. Cl. ....................... 526/194; 252/8.5 M; 260/29.6 R; 260/29.6 H; 260/29.6 M; 260/29.6 MM; 260/42.16; 260/42.53; 526/130
[58] Field of Search ............ 260/17.4 GC, 42.16, 260/42.53, 29.6 M, 29.6 MM, 29.6 H, 29.6 R; 526/91, 130, 194

[56] References Cited
U.S. PATENT DOCUMENTS

| | | | |
|---|---|---|---|
| 2,795,545 | 6/1957 | Gluesenkamp | 252/28 |
| 2,922,768 | 1/1960 | Mino et al. | 260/17.4 |
| 3,032,518 | 5/1962 | Segro | 260/17.4 |
| 3,068,185 | 12/1962 | Stamberger | 260/29.6 |
| 3,318,826 | 5/1967 | Bridgeford | 260/17.4 |
| 3,346,535 | 10/1967 | Dekking | 260/41.5 |
| 3,557,038 | 1/1971 | Gebura | 260/29.2 |
| 3,773,708 | 11/1973 | Takahashi et al. | 260/41 R |
| 3,904,568 | 9/1975 | Yamaguchi et al. | 260/29.6 M |

Primary Examiner—Harold D. Anderson
Assistant Examiner—E. A. Nielsen
Attorney, Agent, or Firm—William C. Norvell, Jr.

[57] ABSTRACT

A reaction process and product obtained thereby, said process comprising reacting a polymerizable monomeric compound containing a polymerizably reactive vinyl group, such as methyl methacrylate, acrylonitrile, vinyl acetate, or the like, in an aqueous medium at a pH not greater than about 3.5 in the presence of a ceric salt which is soluble in at least one component of said medium, and an inorganic substrate, such as a clayey substrate, e.g., montmorillonite, or the like, capable of initiating polymerization of said monomeric compound, wherein said inorganic substrate is a reducing agent for said reaction.

133 Claims, No Drawings

GRAFT COPOLYMER AND PROCESS FOR MAKING SAME

BACKGROUND OF THE INVENTION

1. Field of the Invention

The present invention relates to a process of grafting a vinyl polymeric material onto an inorganic substrate utilizing ceric ion as the reaction initiator. The invention also relates to the product obtained from said process.

2. Description of the Prior Art

Polymeric materials are composed of long chains of one or more monomeric elements covalently bonded together to form a macromolecule. Examination of a homopolymer or random copolymer at the microscopic level reveals that over a sufficiently long segment, the composition and structure of the segments are essentially constant and independent of the respective monomer positions along the chain. This relative homogeneity is in direct contrast to the heterogeneity of those macromolecules known as block or graft copolymers. These macromolecules involve two or more long homogenous segments covalently bonded to adjacent homogeneous segments which differ in either composition or structure. When such segments are arranged in linear arrays, the macromolecule is termed a block polymer; when the segments form a branched structure involving a main chain to which are attached side chains of a different composition, the macromolecule is termed a graft polymer.

Graft polymerization depends on the creation of active sites on the substrate. In general, there are three approaches to creating these active sites so that graft polymerization can occur: chain-transfer activation, radiation or photochemical activation, and chemical activation. Both chain transfer and chemical activation can be applied to either radical or ionic graft polymerization methods.

In chain-transfer grafting, a mixture of three products is formed: unmodified backbone polymer, graft copolymer, and homopolymer of the monomer to be grafted. This mixture is particularly troublesome in chain-transfer grafting because the grafting efficiency is a function of a large number of variables, such as the type of initiator, the particular structure of the substrate, the type of monomer, the ratio of reactants and the reaction conditions.

Activation grafting is the creation of active sites on the substrate by the absorption of radiant energy. Either ultra-violet light or high energy radiation can be used as the energy source. The activation can be conducted as preirradiation of the polymeric substrate or as mutual irradiation of the polymeric substrate and the monomer to be grafted. By either method, the rate and efficiency of the initiation is dependent upon the type of radiation, the radiation dose (total energy absorbed), the dose rate (rate at which energy is absorbed), and the radiation sensitivity of materials involved. Generally, the radiation dose determines the number of grafted chains, while the dose determines the chain lengths.

Chemical grafting is the term applied to grafting reactions involving preformed labile groups either on the backbone or on pendant groups of the substrate, and can be used in the preparation of graft polymers by either free radical or ionic methods.

In free radical-initiated chemical grafting, active sites are often created as a result of a hydrogen abstraction reaction. The polymerization reaction is thus initiated directly by a polymer chain radical, and when unsaturated monomer is present, polymerization occurs, resulting in the newly formed polymer being covalently bonded or grafted onto the existing polymer molecule.

One of the more widely investigated free radical chemical grafting techniques depends on the redox reaction of certain salts with organic reducing agents. This reaction proceeds by a single electron transfer with the formation of organic free radicals. For example, the patent to Mino et al., U.S. Pat. No. 2,922,768 teaches the polymerization of vinyl monomers in the presence of ceric salt with organic reducing agents, such as alcohols, aldehydes, thiols glycols, and amines. If a polymeric reducing agent such as poly (vinyl alcohol) or cellulose is employed, and the oxidation is conducted in the presence of a vinyl or olefin monomer, graft polymerization will occur on the substrate.

The ceric ion grafting technique is applicable to a large variety of polymeric backbones, both natural and synthetic. Characteristic of effective backbone polymers are polygalactosides such as carrageenans, and an even greater variety among synthetic polymers since these can be tailored to include a reactive group.

Ceric ion initiated graft polymerization has been utilized in conjunction with a large number of hydroxyl, thiol, and amine containing polymeric substrates, including cellulose and starch. Cellulose is readily abundant raw material, but its properties are such that it cannot be used directly. Due to its extremely strong hydrogen bonding forces, it is highly crystalline in nature, insoluble in most solvents, and decomposes at high temperatures without flowing or melting.

Although similar to cellulose in structure, when a water slurry of starch is heated to near boiling, the hydrogen bonds are broken, and a smooth dispersion results. Both starch and cellulose are polymers of glucose in which the glucose units are joined together by glucoside linkages at carbons 1 and 4. The two polysaccharides differ only in the configuration at carbon 1.

The formation of small amounts of homopolymer during ceric ion grafting is well known. Although many of the monomers capable of being grafted onto cellulose via ceric ion initiation undergo ceric ion initiated homopolymerization in the absence of cellulose or similar substrates, there is a marked decrease in reaction rate, yield, and molecular weight of the polymer.

The graft copolymerization of vinyl monomers onto cellulose in the presence of ceric salts proceeds readily when the monomer is a polar electron acceptor monomer such as acrylonitrile or ethyl acrylate; nonpolar hydrocarbon electron donor monomers such as butadiene or styrene which readily undergo radical polymerization graft onto cellulose only with difficulty or under special conditions. The same type of grafting activity is observed when starch is the substrate polymer with respect to the monomers which will graft.

The prior art is prolific with reference to certain polymeric materials which are distinguishable from the product and the process of the present invention. For example, U.S. Pat. No. 2,738,740 discloses polymeric compositions of ethylenically unsaturated compounds which contains or which may be coated upon an inorganic siliceous solid which is chemically bonded to the polymer through a siloxy oxygen linkage. Clays, such as attapulgite and bentonite are included in the inorganic siliceous solid classification. However, these materials must be acid treated in order to be activated. The patent discloses ethylenically-unsaturated monomers which are not polymerized directly onto the inorganic solid, but rather to an unsaturated ester which has been chemically bonded to the solid by esterifying it with an unsaturated alcohol.

U.S. Pat. No. 2,795,545 discloses the formation of an adduct between inorganic hydrophilic solids having high surface areas and cationic polymers. Once such an adduct is formed, free polymeric material cannot be extracted with the solvent for the polymer. Preferred inorganic solids include naturally occurring clayey substances containing large proportions of montmorillonite and cationic polymers including polymers of various pyridines, amides, an amines.

U.S. Pat. No. 2,865,880 teaches the polymerization of acrylonitrile in the presence of colloidal aluminum and silicon oxides using peroxide initiators such that the resulting polyacrylonitrile contains colloidal aluminum and silicon oxides uniformly dispersed throughout.

U.S. Pat. No. 2,967,168 discloses a process for preparing silica containing chemically bonded vinyl groups by cohydrolyzing a vinylchlorosilane and silicon tetrahalide in an aqueous solution. The vinyl modified silica areogel is subsequently copolymerized with unsaturated monomeric materials using a peroxide initiator to yield copolymers in which the silica is an intergral part of the polymer. This disclosure differs substantially from the invention as disclosed in the present application in that the inorganic solid is chemically bonded to an unsaturated monomeric material in a process separate from the polymerization process. Additionally, this reference does not utilize acidic initiator to initiate the polymerization process.

U.S. Pat. No. 3,068,158 teaches the adsorption of a free radical-forming initiator on the surface of a clay mineral. The catalyst-treated clay is dispersed in a fluid medium. Thereafter, an ethylenically unsaturated monomer capable of being polymerized by said catalyst is added, and the reaction mixture is polymerized. The final polymeric product is a dispersion of essentially discrete particles of clay having a surface film of polymer. The free radical initiators include organic and inorganic peroxides, organic percarbonates, and certain azo compounds. It should be noted that in applicant's invention, the inorganic clayey substrate is not brought into contact with the free radical initiator prior to adding the unsaturated monomer.

U.S. Pat. No. 3,208,984 discloses the formation of an adduct between any solid which undergoes an ion exchange type of reaction with organic compounds containing basic nitrogen and an organic azo compound having at least one basic nitrogen radical. The preferred solid substrates are naturally occurring alumino-silicate clays which must be acid treated prior to reaction. The acid clay-organic azo adduct is then used as a free radical initiator for ethylenically unsaturated monomers which results in the formation of polymeric chains which are chemically bonded to the solid substrate surface. In the present invention, the clayey substrate is not acid treated prior to reaction.

U.S. Pat. No. 3,272,749 discloses the graft polymerization of an ethylenically unsaturated monomeric material which may be made water soluble by hydrolysis onto a poly (vinyl alcohol) substrate using a ceric salt initiator. The disclosure is limited to the use of an organic substrate.

U.S. Pat. No. 3,318,826 discloses a clayey substance which is treated to bind ferrous iron by ion exchange. The clay then is mixed with a styrene monomer. After heating, the clay will contain a polymer anion.

U.S. Pat. No. 3,346,535 discloses the base exchanging of a suitable polymerization initiator onto carbon and subsequent employment of the carbon-initiator complex to initiate polymerization of a suitable vinyl monomer and thereby graft propagate a polymeric chain from the carbon atom. Suitable polymerization initiators must have one or more cationic groups capable of ionically bonding to carboxylic acid radical of the carbon. Preferred initiators include heterocyclic azo initiators which minimize the formation of homopolymer. The vinyl monomer is added and heat is applied to create free radicals from the bound azo initiator, which subsequently cause graft polymerization of the monomer onto the carbon substrate.

U.S. Pat. No. 3,557,038 discloses the graft polymerization of diacetone acrylamide with or without an unsaturated comonomer onto the surface of a siliceous solid using a peroxy compound capable of initiating a free radical polymerization.

Surprisingly, I have discovered that certain inorganic substrates such as clayey materials, alumina-silicates, and the like, may serve as the substrate onto which a vinyl monomer is graft polymerized in the presence of a ceric ion initiator.

It has been considered impossible to prepare graft copolymers containing an inorganic substrate and which are essentially free of homopolymers except with elaborate and impractical processes. By this process, a graft copolymer of a vinyl polymer and an inorganic substrate may be produced.

The resulting product of the process of the present invention may be utilized in many commerical applications either alone or in combination with other compositions. For example, the present graft copolymer product has application as an additive for fluids used in the drilling of subterranean oil and gas wells. In many instances, the polymerization product of the present invention may be further co-reacted with various resins to achieve a wide variety of desired end properties, particularly in the fields of textiles and paper chemistry.

SUMMARY OF THE INVENTION

The present invention relates to and has as a principal object a process for polymerizing a polymerizable monomeric compound containing a polymerizably reactive vinyl group in an aqueous medium at a pH not greater than about 3.5 in the presence of certain inorganic reducing agents and a ceric salt which is soluble in at least one component of the reaction medium. Additionally, this invention relates to a polymerization process in an aqueous solvent wherein a vinyl or vinylidene monomer is polymerized in the presence of an inorganic reducing agent and in the presence of a ceric salt which is soluble in at least one component of the reaction medium wherein the pH of the aqueous medium is maintained at about 3.5 or less. The invention also relates to a process of polymerizing in an aqueous emulsion, a polymerizable vinyl or vinylidene monomer at a pH not greater than about 3.5 in the presence of a ceric salt which is soluble in at least one component of the reaction medium and certain inorganic reducing agents. The invention also relates to the polymerization products produced which comprise a polymeric inter-reaction product of polymerizable monomer that contains a polymerizably reactive vinyl group and an inorganic reducing agent which is capable of being oxidized by said ceric salt and which is capable of initiating the polymerization process. Moreover, the present invention relates to the products derived from the process hereinabove described.

Other objects and advantages of the use of the present invention will be apparent from a reading of the discription of the preferred embodiments and claims which follow.

DESCRIPTION OF THE PREFERRED EMBODIMENTS

The present polymerization process is carried out in an aqueous solution or an aqueous emulsion as contrasted with other solvent polymerization processes such as organic solvent polymerization or even bulk polymerization. Inasmuch as the process of the present invention may be carried out in a aqueous solvent medium or in an aqueous emulsion medium, it is immaterial as to whether or not the polymerizable monomeric vinylidene or vinyl compound is water soluble. If the polymerizable material is at least partially water soluble, use of an emulsion system is not necessary. Alternatively, if the polymerizable monomer is only partly soluble in water, the polymerization can be carried out in an aqueous solvent medium, without benefit of an emulsifying agent, by means of a pre-selected dispersing agent, or by use of a dispersing technique such as rapid agitation wherein the monomeric material, the reducing agent, and the ceric salt have ample opportunity to come into reactive contact with one another to produce the desired polymerization product. In the case of monomeric materials that are slightly soluble in water or are substantially completely insoluble in water, the emulsion polymerization technique is recommended.

In carrying out the process, it is imperative to use at least one of a class of certain inorganic reducing agents as described more fully below together with a ceric salt which is soluble in at least one component of the reaction medium, for instance in the vinylidene monomer and/or water.

By use of the terms "polymerizable vinyl group" and "polymerizably reactive vinyl group", we mean to refer only to and claim those monomers containing polymerizable vinyl groups which are not inhibited by the inorganic reducing agent. These include vinylidene compounds and/or vinyl compounds. More specifically, the following polymerizable monomers may be used: acrylic compounds, such as acrylic acid and its homologs, such as methacrylic acid, alpha-methacrylic acid, alpha-chloracrylic acid and the like and derivitives thereof such as the anhydrides, amides and nitriles, and the acrylic-type acid esters of monohydric alcohols such as the methyl, ethyl, propyl, butyl, isobutyl, amyl, hexyl, cyclohexyl, heptyl, octyl, and decyl alcohols of the acrylic type acid esters of polyhydric alcohols such as ethylene glycol, diethylenglycol, glycerol, pentaerythritol, dipentaerythritol, propyleneglycol, dipropyleneglycol, and the like. Still further, as a polymerizable monomer, one may use ally compounds such as allyl alcohol or allyl or substituted allyl esters such as methallyl esters. More specifically, one may use allyl acetate, allyl propionate, allylchloroacetate, allyl caproate, allyl linoleate, allyl benzoate, methallyl acetate, the allyl esters of isobutyric acid, allyl acrylate, diallyl carbonate, diallyl oxalate, diallyl phthalate, diallyl maleate, triallyl cyanurate, and the like. Still further, one may make use of the vinyl or vinylidene esters such as vinyl acetate, vinyl chloride, vinylidene chloride, vinyl propionate, vinyl butyrate, and the like. Vinyl ethers also are believed to be utilizable, such as vinylethylether, vinylpropylether, vinylisobutylether and the like or other vinyl compounds such as divinylsulfone, divinylsulfide, and the like. Additionally, one may make use of the unsaturated polymerizable amides, such as acrylamide, methacrylamide, ethacrylamide, methylene bisacrylamide and the like, or the nitriles such as acrylonitrile, methacrylonitrile, ethacrylonitrile, alpha-chloroacrylonitrile, and the like, styrene, and substituted styrenes, such as ring-substituted and side chain substituted styrenes, such as alpha-chlorostyrene, alpha-methylstyrene, 2, 4-dimethylstyrene, 2,-5-dimethylstyrene, 2,4,5-trimethylstyrene, p-ethylstyrene, o-bromostyrene, 2-bromo-4-ethylstyrene, p-isopropylstyene, and p-chlorostyrene, 2,4-dichlorostyrene. Whenever desirable, these polymerizable monomers may be used either singly or in combination with one another.

In the practice of the present invention, it is imperative that an inorganic reducing agent be used which is capable of being oxidized by the ceric salt which is present in the system and which is also capable in this activated state of initiating the polymerization of the compound containing the vinyl group. Various inorganic solids having hydroxyl groups or which form hydroxyl groups when in aqueous solutions may be utilized in the invention as the inorganic reducing agent. These inorganic solids include the oxides and hydroxides of selected alkaline earth metals, iron, aluminum, silicon, magnesium, as well as the synthetic and naturally occurring alumino-silicates, such as clays, zeolites, molecular sieves, and the like.

Preferred alumino-silicates are the naturally occurring clays which are available having a wide variety of chemical and physical properties. For the purposes of the present invention, these clays may be classified into non-swelling or expanding lattice types.

The non-swelling type includes illite having a three-layer non-expanding lattice; kaolinite, nacrite, dickite, anauxite, halloysite and endellite, which have a two-layer crystal; allophane, an amorphous solid, chlorite, mica, brucite, and the like, having mixed layers; attapulgite and sepiolite, having a chain-like or fibrous structure. In general, these clays have a low base exchange capacity.

The expanding lattice clays include montmorillonite, sauconite, vermiculite, montronite, saponite, and the like, which have a three-layer crystal. These clays are commonly found in admixture in bentonite clays having an average aluminum oxide content less than about 20 percent. The bentonite clays also have a high base exchange capacity, commonly between about 50 and 150 millequivalents per 100 grams of air-dried clay. Commercial deposits of swelling or expanding lattice clays are found in Wyoming, South Dakota, Montana, Utah, Nevada and California.

The aforedescribed clays and natural zeolites are usually found in a form wherein the cation exchange sites are occupied with alkali and/or alkaline earth metals. The commercially synthetic zeolites are also available with their exchange sites occupied by an alkali metal, such as sodium, lithium, potassium, and the like; and alkaline earth metals, such as calcium, magnesium, and the like.

The reaction process of the present invention may be carried out at temperatures between about 0° C. and 100° C., but preferably at temperatures between about 10° C. and 50° or 60° C. Temperatures significantly above about 70° C. are to be avoided as a general rule because the redox system sometimes decomposes too rapidly at these temperatures.

The process of the present invention may be carried out under pressure or under partial vacuum, but it is preferred to utilize atmospheric pressure inasmuch as the reaction proceeds very favorably at this pressure.

The process of the present invention may be carried out at any pH value up to about 3.5. Extremely low pH values are operable as evidenced by polymerization as shown in the examples below. The pH value is maintained between about 1 and 2 in aqueous polymerization reactions for optimum results. If the polymerization involves the use of an emulsion system and an inorganic reducing agent, the pH value can be increased somewhat, but still preferably below about 3.5.

The amount of ceric ion compound which is utilized in the practice of the process of the present invention can be varied over fairly wide limits. For example, one may utilize from about $10^{-6}$ to $10^{-1}$ mole of ceric ion per mole of polymerizable monomer. Preferably one would use between $10^{-3}$ to $10^{-2}$ mole of ceric ion per mole of polymerizable monomer. Ceric ion is preferably introduced into the reaction mixture in the form of a ceric salt. Among the salts adapted for use in the present invention are ceric nitrate, ceric sulfate, ceric ammonium nitrate, ceric ammonium sulfate, ceric ammonium pyrophosphate, ceric iodate, ceric salts of organic acids, such as cerium naphthenate and cerium linoleate and the like. These compounds may be employed singly or in combination with one another. Ceric compounds which are capable of forming ceric salts in situ under the acid conditions of the polymerization reaction, such as ceric oxide, ceric hydroxide and the like, may be utilized. When aqueous emulsion technique is utilized, an emulsifying agent of which there are many known to those skilled in the art may be used. Inasmuch as the process is preferably carried out at a pH value not greater than about 3.5, it is preferred to make use of those emulsifying agents which do not tend to precipitate from an acid medium, particularly those within the operating pH range. Among the emulsifying agents which may be used herein are the sodium dialkyl sulfosuccinates such as sodium diisobutyl sulfosuccinate, sodium diamyl sulfosuccinate, sodium dihexyl sulfosuccinate, sodium dioctyl sulfosuccinate, sodium ditridecyl sulfosuccinate and the like, or the sodium alkyl aryl sulfosuccinates such as sodium octyl benzene sulfonate, sodium decyl benzene sulfonate, sodium isopropyl naphthalene sulfonate, and the like. Additionally, the sodium alkyl sulfates, such as sodium lauryl sulfate or sulfonated mineral oils may be utilized. Salts other than sodium may be used; for instance, the potassium salts, the lithium salts and the like.

Quite obviously, these emulsifying agents may be used either singly or in combination with one another. The amount of emulsifying agent used will depend in some measure on the degree of water insolubility of the components used in the reaction, namely, the vinylidene monomer. At any rate, the amounts conventionally used as a range will find adequate application in the present invention.

In general, the time required to achieve a desired degree of polymerization may be determined empirically. Thus, for example, a given polymer may be precipitated at different time intervals and the extent of polymerization determined gravimetrically to determine the percent of the conversion of the monomer to polymeric material. Where the amount of ceric ion and monomer is known, suitable reaction times may be readily established to achieve the desired degree of polymerization. In addition, the ceric ion when being reduced undergoes a color change from yellow to brown to a substantially colorless state, at which time it is substantially completely reduced and will no longer effectively initiate polymerization. Thus, in an aqueous system, an operator should be able to determine when the reaction has gone to substantial completion.

Should it be desirable to halt the reaction at any given time, while ceric ion is still present in the reaction mixture, this may be done by the addition of hydroquinone, sodium sulfite, or ferrous sulfate, which materials exhaust the remaining ceric ion substantially instantaneously, thus halting the reaction, and functioning as an inhibitor of continuous reaction thereafter. Furthermore, as an additional method of halting the reaction, the pH of the reaction mixture may be adjusted to the alkaline side, as for example, to a pH of between about 7 and about 8, precipitate out the remaining portion of the ceric compound, prohibiting its further reaction, thus stopping the reaction.

The amount of reducing agent to monomeric material may be varied extensively depending on the properties of the ultimate product desired. As a consequence, comparatively large excesses of either material may be utilized in alternative reactions. Additionally, the inorganic substrate-to-solvent ratio may be varied without substantial adverse effect upon the polymerization yield or upon the percent of grafting thereof onto the substrate surface.

The inorganic reducing agent used in the present invention may be employed in amounts from about 0.01% to about 1000% based on the weight of the monomer utilized. The amount may be preferably varied from about 0.01% to about 100% based on the weight of the monomer.

Referring now to the concept of grafting of polymer onto inorganic substrates, it is believed that the number of such grafts on a given substrate may be controlled by varying the amount of ceric ion added to the reaction mixture. Thus where a large amount of ceric ion is to be added to a given reaction mixture, instead of one such grafted side chain, a number of such grafted side chains could be formed, theoretically, at least, at any point on the substrate where the active group of the inorganic reducing agent identified above is found. The length of the polymeric chain is a function of the monomer concentration, ceric ion concentration, temperature and chain transfer constant of the substrate.

The various concepts of ceric ion grafting onto cellulose are believed applicable to inorganic substrate grafting in which case the initiating sites are produced primarily on the substrate. In this proposed mechanism, a ceric ion substrate complex would be formed initially, and similar to the reaction observed with simple organic reducing agents, the ceric ion would be reduced to cerous ion via a one-electron transfer, and a free radical would be generated on substrate. When a vinyl monomer is present in the polymerization mixture, the radical site so generated on the substrate would initiate graft polymerization.

Graft copolymers may, of course, be prepared by conventional methods which take advantage of the chain transfer reaction between growing polymer chains and the backbone. However, the yields of graft copolymers obtained are low and are a function of the degree of conversion. Other methods take advantage of catalysts like persulfates and peroxides, which decompose to produce free radicals. In these cases, however, a mixture of homopolymers and graft copolymers are obtained because conventional initiators activate the monomer as well as the backbone.

With ceric salts in the redox system of the present invention, the graft copolymers are the predominate and desired product, because the substrates are attacked very rapidly at relatively low temperatures, while the monomers are not.

The advantages of graft copolymers over mixed copolymers is well known, for example, the solvent resistance of graft copolymers is much improved over that of mixtures of polymers.

In all examples set forth below, the selected substrate was obtained from commercial sources and was reacted without any pre-treatment.

EXAMPLES 1 through 13

The present Examples demonstrate a process for preparing the graft copolymer of the present invention utilizing methyl methacrylate as the monomeric material and a selected inorganic solid. In all tests except those conducted using Wyoming bentonite, the monomeric methyl methacrylate was distilled prior to use to remove the polymerization inhibitor contained in this commercially available product. 13.2 grams of methyl methacrylate were added to 54 grams of an aqueous slurry containing a pre-selected inorganic solid clay substance identified below. The aqueous slurry contained 4 grams of the pre-selected clay. To the slurry and the monomer were added 4 milliliters of 0.5M ceric ammonium nitrate in 1N nitric acid, to provide the ceric initiator in a sufficiently acidic solution to provide ionization. The mixture was shaken and allowed to stand at ambient temperature (about 22° C.) for 64 hours. The final product was washed with deionized tap water and dried in a vacuum oven at 70° C. The resulting products were extracted with methyl ethyl ketone using a Soxhlet extractor for a minimum of 48 hours or until no more homopolymer could be extracted from the resulting product. As shown in Table I below, good yields of nonextractable copolymer were obtained with all of the inorganic solid substrates.

Table I

| Example No. | Substrate | Percent of Monomer Conversion | Percent Nonextractable Polymer |
|---|---|---|---|
| 1 | Wyoming Bentonite[1] | 88.1 | 30.8 |
| 2 | D.O. | 91.0 | 46.0 |
| 3 | Panther Creek Bentonite[2] | 88.3 | 55.4 |
| 4 | Illite | 87.1 | 66.7 |
| 5 | Mica | 98.7 | 57.9 |
| 6 | Attapulgite | 92.4 | 91.1 |
| 7 | Kaolin | 93.8 | 67.4 |
| 8 | Silica | 96.6 | 60.9 |
| 9 | Silica Gel | 98.0 | 67.2 |
| 10 | Asbestos | 89.9 | 54.1 |
| 11 | Saponite | 84.4 | 91.8 |

Table I-continued

| Example No. | Substrate | Percent of Monomer Conversion | Percent Nonextractable Polymer |
|---|---|---|---|
| 12 | Talc | 94.4 | 63.4 |
| 13 | Alumina, Neutral | 97.1 | 40.3 |

[1]predominantly sodium montmorillonite
[2]predominantly calcium montmorillonite

EXAMPLES 14 through 23

The present Examples demonstrate the reaction of numerous pre-selected monomeric materials in conjunction with ceric ion initiator and an inorganic substrate. The tests were conducted as in Examples 1 and 2, utilizing four grams of inorganic substrate clay-like material (Wyoming Bentonite) in 50 milliliters of water, thereafter adding to the clay slurry 0.132 moles of the selected monomeric material and 0.04 moles per liter of ceric ammonium nitrate in 1N nitric acid. In each of the samples reacted and tested, it was found that significant percentages of converted monomer were not extractable from the montmorillonite substrate, indicating the formation of a graft copolymer. The results of these tests are set forth in Table II below:

Table II

| No. | Monomer | Percent of Monomer Conversion | Percent Nonextractable Polymer |
|---|---|---|---|
| 14 | Styrene[1] | 86.3 | 33.7 |
| 15 | Acrylonitrile | 96.5 | 100.0 |
| 16 | Methacrylonitrile | 85.9 | 41.1 |
| 17 | Methyl Acrylate | 95.5 | 8.5 |
| 18 | Ethyl Acrylate | 100.0 | 41.4 |
| 19 | Butyl Acrylate | 91.0 | 54.0 |
| 20 | Methyl Methacrylate | 88.1 | 30.8 |
| 21 | D.O. | 91.0 | 46.0 |
| 22 | Vinyl Acetate | 73.7 | 23.2 |
| 23 | Acrylamide | 92.2 | 55.1 |

[1]0.132 moles of styrene/acrylonitrile in a 1-to-1 mole ratio

EXAMPLES 24 through 27

The present Examples demonstrate the effect on the reaction of varying the monomer-to-clay ratio. The test procedure was the same as that utilized in previous examples. The monomeric material was methyl methacrylate, and the inorganic substrate was Wyoming Bentonite in a slurry containing 4 grams of clay per 50 milliliters of water. Ceric ammonium nitrate was again utilized as the initiator at a concentration of 0.04 moles per liter of solution. The results of these tests indicate that the variation in the monomer-to-clay ratio has little effect upon the yield of polymeric product, but will effect the percent of grafting onto the inorganic substrate, as indicated in the table below:

Table III

| Example No. | Moles of Monomer | Clay/Water ratio (grams) | Initiator (Moles/l.) | Percent of Monomer Conversion | Percent Nonextractable Polymer |
|---|---|---|---|---|---|
| 24[1] | 0.066 | 4/50 | 0.04 | 87.8 | 41.6 |
| 25[2] | 0.132 | 4/50 | 0.04 | 88.1 | 30.8 |
| 26[2] | 0.132 | 4/50 | 0.04 | 91.0 | 46.0 |
| 27[1] | 0.396 | 4/50 | 0.04 | 95.0 | 73.6 |

[1]methyl methacrylate distilled prior to use
[2]methyl methacrylate not distilled prior to use

EXAMPLES 28 through 31

The present Examples demonstrate the effect on the reaction of varying the reaction solvent-inorganic solid ratio. The monomer utilized in these tests was methyl methacrylate, with the inorganic substrate being Wyoming Bentonite, and the initiator being ceric ammonium nitrate in amounts set forth below in Table IV. As shown in the following table, the variation in the ratio of the solvent to solid affected the yield of the polymer formed from the monomeric material as well as the formation of nonextractable polymer. The results of these tests, which were conducted in accordance with the detail set forth for Examples 1 through 13, are set forth below:

Table IV

| Example No. | Moles of Monomer | Clay/Water ratio (grams) | Initiator (Moles/l.) | Percent of Monomer Conversion | Percent Nonextractable Polymer |
|---|---|---|---|---|---|
| 28[1] | 0.132 | 4/50 | 0.04 | 88.1 | 30.8 |
| 29[1] | 0.132 | 4/50 | 0.04 | 91.0 | 46.0 |
| 30[2] | 0.132 | 4/100 | 0.04 | 96.9 | 70.7 |
| 31[2] | 0.132 | 4/200 | 0.04 | 97.6 | 77.7 |

[1]methyl methacrylate not distilled prior to use
[2]methyl methacrylate distilled prior to use

EXAMPLES 32 through 37

The present Examples demonstrate the effect on the reaction of varying the concentration of the ceric ion initiator. Methyl methacrylate was again utilized as the monomeric material in a aqueous slurry of Wyoming Bentonite. The ceric ion was made available through ceric ammonium nitrate in varying amounts. The results of these tests indicated that only at the higher amounts of initiator concentration was the percent nonextractable polymer affected and only at the lower amounts of initiator concentration was the percent monomer conversion affected. However, in each instance, good percentages of nonextractable polymer and good percentages of monomeric conversion were obtained. The results of these tests are set forth in the Table below:

Table V

| Example No. | Moles of Monomer | Clay/Water ratio (grams) | Initiator (Moles/l.) | Percent of Monomer Conversion | Percent Nonextractable Polymer |
|---|---|---|---|---|---|
| 32[1] | 0.132 | 4/50 | 0.2 | 83.9 | 30.2 |
| 33[2] | 0.132 | 4/50 | 0.04 | 88.1 | 30.8 |
| 34[2] | 0.132 | 4/50 | 0.04 | 91.0 | 46.0 |
| 35[1] | 0.132 | 4/50 | 0.008 | 86.1 | 77.3 |
| 36[1] | 0.132 | 4/50 | 0.004 | 88.5 | 75.1 |
| 37[1] | 0.132 | 4/50 | 0.0004 | 57.1 | 76.9 |

[1]methyl methacrylate distilled prior to use
[2]methyl methacrylate not distilled prior to use Although not fully understood, it is believed that the presence during the reaction of ceric initiator may terminate the reaction. In such instances, the free radical on the growing polymer chain is attracted to the $Ce^{+4}$ ion, reducing it to $Ce^{+3}$, resulting in the formation of a dead polymer molecule. When the ceric initiator is present in large excess amounts, grafting is reduced and erratic results are obtained.

EXAMPLES 38 through 43

The present Examples demonstrate the effect of adding to the slurry the initiator at varying time intervals prior to addition of the monomeric material. It was found that the interval of time from the addition of the initiator to the time of the addition of the monomer did not necessarily adversely effect the reaction. Results of this test, which were run in accordance with the parameters set forth for Examples 1 through 13 utilizing methyl methacrylate (distilled) as the monomeric material, Wyoming Bentonite the inorganic substrate, and ceric ammonium nitrate as the donor of ceric ion, are set forth below:

Table VI

| Example No. | Aging Time | | | | | |
|---|---|---|---|---|---|---|
| | 38 One Min. | 39 .30 Min. | 40 1 Hr. | 41 2 Hrs. | 42 4 Hrs. | 43 24 Hrs. |
| % Monomer Conversion | 92.0 | 89.1 | 91.3 | 91.2 | 95.1 | 93.8 |
| % Nonextractable Polymer | 35.1 | 49.4 | 55.4 | 19.2 | 57.9 | 32.2 |

EXAMPLES 44 through 50

The present examples are similar to Examples 38 through 43, however, the amount of addition of ceric ammonium nitrate was reduced to 4 milliliters of 0.05 ceric ammonium nitrate in order to avoid the possible adverse effects of excessive initiator. The results indicate that optimum nonextractable polymer is obtained when the order of addition is as specified in Examples 1 through 13 and without aging. These results are set forth below:

Table VII
Effect of Adding Methyl Methacrylate in Bentonite and Aging Prior to Ceric Ammonium Nitrate Addition

| Example No. | 44 | 45 | 46 | 47 |
|---|---|---|---|---|
| Time | 24 Hrs. | 2 Hrs. | .5 Hr. | .01 Hr. |
| % Monomer Conversion | 80.8 | 79.3 | 86.5 | 77.7 |
| % Nonextractable Polymer | 63.6 | 76.1 | 78.6 | 96.3 |

Table VIII
Effect of Adding Ceric Ammonium Nitrate to Bentonite and Aging Prior to Methyl Methacrylate Addition

| Example No. | 48 | 49 | 50 |
|---|---|---|---|
| Time | 24 Hrs. | 2 Hrs. | .5 Hr. |
| % Monomer Conversion | 80.1 | 75.2 | 80.9 |
| % Nonextractable Polymer | 90.3 | 78.3 | 84.8 |

EXAMPLES 51 through 53

The present examples demonstrate a process for preparing the graft copolymer of the present invention utilizing methacrylonitrile as the monomeric material and selected inorganic solids. The monomeric methacrylonitrile was distilled prior to use to remove polymerization inhibitor. In each example, 8.85 grams of monomer were added to 50 milliliters of an aqueous slurry containing the pre-selected inorganic solid substance as identified below. The aqueous slurry contained 4 grams of the pre-selected clay. To the slurry and the monomer were added 4 milliliters of ceric ammonium nitrate (0.5M) in 1N nitric acid, to provide the ceric initiator in a sufficiently acidic solution to provide ionization. The mixture was shaken and allowed to stand at ambient temperature for about 64 hours. The final product was washed with deionized water and dried in a vacuum oven at 70° C. The resulting products were extracted until no more homopolymer could be extracted from the resulting product. As shown in Table IX below, good yields of nonextractable copolymer were obtained with all of the inorganic substrates.

Table IX

| Examples No. | Substrate | Percent of Monomer Conversion | Percent Nonextractable Polymer |
|---|---|---|---|
| 51 | Bentonite | 85.9 | 41.1 |
| 52 | Attapulgite | 56.1 | 47.1 |
| 53 | Saponite | 78.9 | 100.0 |

EXAMPLES 54 through 57

The following examples were conducted to determine the effect of pH variance upon the grafting of methyl methacrylate onto bentonite as the inorganic substrate. The reaction was conducted as described for examples 51 through 53, with 13.2 grams of methyl methacrylate monomer being utilized with 4 grams of bentonite in 50 milliliters of water. The test indicated that satisfactory polymerization and grafting can be obtained at pH 1.5, while increase in pH adversely effects polymerization and, hence grafting. The present examples indicate that a pH in excess of about 3.4 or 3.5 will yield very little polymerization and almost nondetectable grafting. The Table below indicates the results of this test:

Table X

| Example No. | pH | Percent of Monomer Conversion | Percent Nonextractable Polymer |
|---|---|---|---|
| 54 | 1.5 | 77.7 | 96.3 |
| 55 | 3.4 | 10.0 | Nil |
| 56 | 7.0 | Nil | Nil |
| 57 | 9.0 | Nil | Nil |

EXAMPLES 58 through 62

The present examples demonstrate the grafting ability of methyl methacrylate onto alkali and alkaline earth oxides. The reaction was as described in the previous examples, utilizing 25 milliliters of water, 7.45 grams of monomer and 2 milliliters of 0.5M ceric ammonium nitrate in 1N nitric acid. Two grams of the selected substrate were utilized in each example. As set forth above, the present Examples 58, 61 and 62 indicate that some alkali and alkaline earth oxides are not compatible with the selected monomeric material to yield a satisfactorily grafted end product. However, Examples 59 and 60 clearly indicate successful polymerization and grafting. The results of these examples are set forth in the Table below.

Table XI

| Example No. | Substrate | Percent of Monomer Conversion | % Nonextractable Polymer |
|---|---|---|---|
| 58 | ZnO | 0 | 0 |
| 59 | $Fe_2O_3$ | 72.6 | 29.7 |
| 60 | $TiO_2$ | 63.2 | 8.0 |
| 61 | $V_2O_5$ | 12.5 | Nil |
| 62 | CaO | 0 | 0 |

EXAMPLES 63 through 65

The present examples demonstrate the effect of modification of the clay-water ratio on the polymerization yield. In the tests set forth below, saponite was selected as the inorganic substrate and methacrylonitrile was utilized as the monomeric material. In each example, 4 grams of saponite were utilized and 8.85 grams of monomer were utilized. Four milliliters of 0.5M ceric ammonium nitrate in 1M nitric acid were utilized as the initiator. The water variation did not adversely effect the percent of polymerization, nor the percent of grafting. The results of these tests are set forth in the table below.

Table XII

| Example No. | Amount Water | Percent of Monomer Conversion | % Nonextractable Polymer |
|---|---|---|---|
| 63 | 200 ml. | 52.2 | 100 |
| 64 | 100 ml. | 54.2 | 100 |
| 65 | 50 ml. | 52.5 | 100 |

EXAMPLES 66 through 69

The present tests were conducted to determine the effect of variation in the monomer-initiator ratio. In the present tests, saponite was utilized as the inorganic substrate and methacrylonitrile was utilized as the monomeric material. Four grams of saponite were utilized in 50 milliliters of water. In each example, 8.85 grams of methacrylonitrile were utilized. Varying amounts of ceric ion initiator were utilized in the reaction, as stated below. The examples indicate that with this selected inorganic substrate and monomeric material, reduced amounts of ceric initiator are insufficient to initiate polymerization. However, at increased amounts of initiator (Examples 68 and 69), satisfactory polymerization and grafting occurred. Results of these examples are set forth in the Table below.

Table XIII

| Example No. | Amount of Ceric Initiator | Percent of Monomer Conversion | % Nonextractable Polymer |
|---|---|---|---|
| 66 | 4 ml. - 0.005M | 0 | 0 |
| 67 | 4 ml. - 0.05M | 0 | 0 |
| 68 | 4 ml. - 0.5M | 52.5 | 100 |
| 69 | 3 ml. - 1.25M | 84.3 | 85.3 |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A process comprising polymerizing a monomeric compound containing a polymerizably reactive vinyl group in an aqueous medium at a pH not greater than about 3.5 in the presence of a ceric salt which is soluble in at least one component of said medium and an inorganic substrate having hydroxyl groups or which forms hydroxyl groups in said aqueous medium and which is capable of initiating polymerization of said monomeric compound, wherein said inorganic substrate is a reducing agent in said reaction.

2. A process comprising polymerizing a monomeric compound containing a polymerizably reactive vinyl group dissolved at least partially in an aqueous medium at a pH not greater than about 3.5 and in the presence of a ceric salt which is soluble in at least one compound of the medium, and in an inorganic solid having hydroxyl groups or which forms hydroxyl groups when said solid is present is said medium, said inorganic solid being capable of oxidation by said ceric salt and capable of initiating polymerization of said monomeric compound, wherein said inorganic substrate is a reducing agent for said reaction.

3. A process comprising polymerizing a monomeric compound containing a polymerizably reactive vinyl group dissolved at least partially in an aqueous medium at a pH not greater than 3.5 and in the presence of a ceric salt which is soluble in at least one component of the medium, and an alumino-silicate substrate which is capable of initiating polymerization of said monomeric compound, wherein said substrate is a reducing agent for said reaction.

4. A process comprising polymerizing a monomeric compound containing a polymerizably reactive vinyl group dissolved at least partially in an aqueous medium at a pH not greater than about 3.5 in the presence of a ceric salt which is soluble in at least one component of the medium, and an alumino-silicate inorganic solid which is non-swelling when in said aqueous medium and which is capable of initiating polymerization of said monomeric compound, wherein said inorganic solid is a reducing agent for said reaction.

5. A process comprising polymerizing a monomeric compound containing a polymerizably reactive vinyl group dissolved at least partially in an aqueous medium at a pH not greater than about 3.5 and in the presence of a ceric salt which is soluble in at least one component of the medium, and a swelling lattice-type inorganic solid which is swelling and expanding when in said aqueous medium and which is capable of being oxidized by said ceric salt and which is capable of initiating polymerization of said compound, wherein said inorganic solid is a reducing agent for said reaction.

6. The process of claim 4 wherein the alumino-silicate inorganic solid contains a three-layer non-expanding lattice structure.

7. The process of claim 4 wherein the alumino-silicate inorganic solid contains a two-layer crystalline structure.

8. The process of claim 4 wherein the alumino-silicate inorganic solid contains a mixed layer structure.

9. The process of claim 4 wherein the alumino-silicate inorganic solid contains a chain-like fibrous structure.

10. The process of claim 6 wherein the alumino-silicate inorganic solid has a three-layer non-expanding lattice structure consisting essentially of illite.

11. The process of claim 7 wherein the alumino-silicate inorganic solid contains a two-layer crystalline structure and is a member selected from the class consisting of kaolinite, nacrite, dickite, anauxite, halloysite, and endellite.

12. The process of claim 7 wherein the alumino-silicate inorganic solid has a two-layer crystalline structure consisting essentially of kaolinite.

13. The process of claim 7 wherein the alumino-silicate inorganic solid has a two-layer crystalline structure-consisting essentially of nacrite.

14. The process of claim 7 wherein the alumino-silicate inorganic solid has a two-layer crystalline structure consisting essentially of dickite.

15. The process of claim 7 wherein the alumino-silicate inorganic solid has a two-layer crystalline structure consisting essentially of anauxite.

16. The process of claim 7 wherein the alumino-silicate inorganic solid has a two-layer crystalline structure consisting essentially of halloysite.

17. The process of claim 7 wherein the alumino-silicate inorganic solid has a two-layer crystalline structure consisting essentially of endellite.

18. The process of claim 8 wherein the alumino-silicate inorganic solid has a mixed layer structure consisting essentially of chlorite.

19. The process of claim 9 wherein the alumino-silicate inorganic solid contains a chain-like fibrous structure and is a member selected from the class consisting of attapulgite, palygorskite, and sepiolite.

20. The process of claim 9 wherein the alumino-silicate inorganic solid contains a chain-like fibrous structure consisting essentially of attapulgite.

21. The process of claim 9 wherein the alumino-silicate inorganic solid contains a chain-like fibrous structure consisting essentially of sepiolite.

22. The process of claim 9 wherein the alumino-silicate inorganic solid contains a chain-like fibrous structure consisting essentially of palygorskite.

23. The process of claim 5 wherein the lattice-type inorganic solid contains a three-layer crystalline structure.

24. The process of claim 5 wherein the lattice-type inorganic solid is a member selected from the class consisting of smectite and vermiculite.

25. The process of claim 5 wherein the lattice-type inorganic solid consists essentially of montmorillonite.

26. The process of claim 5 wherein the lattice-type inorganic solid consists essentially of sauconite.

27. The process of claim 5 wherein the lattice-type inorganic solid consists essentially of vermiculite.

28. The process of claim 5 wherein the lattice-type inorganic solid consists essentially of smectite.

29. The process of claim 5 wherein the lattice-type inorganic solid consists essentially of nontronite.

30. The process of claim 5 wherein the lattice-type inorganic solid consists essentially of saponite.

31. The process of claim 6 wherein the lattice-type inorganic solid material comprises bentonite.

32. A process comprising polymerizing in an aqueous emulsion a polymerizable monomeric compound containing a polymerizably reactive vinyl group at a pH not greater than about 3.5 in the presence of a ceric salt which is soluble in at least one component of the aqueous emulsion, and an inorganic substrate having hydroxyl groups or which forms hydroxyl groups when in said aqueous emulsion which is capable of being oxidized by said ceric salt and which is capable of initiating polymerization of said monomeric compound, wherein said inorganic substrate is a reducing agent for said reaction.

33. A process comprising polymerizing a monomeric compound containing a polymerizably reactive vinyl group dissolved at least partially in an aqueous emulsion at a pH not greater than about 3.5 and in the presence of a ceric salt which is soluble in at least one component in the aqueous emulsion, and an inorganic substrate having hydroxyl groups or which form hydroxyl groups when said substrate is present in said aqueous emulsion, said inorganic substrate being capable of oxidation by said ceric salt and further being capable of initiating polymerization of said monomeric compound wherein said inorganic substrate is a reducing agent for said reaction.

34. A process comprising polymerizing a monomeric compound containing a polymerizably reactive vinyl group dissolved at least partially in an aqueous emulsion at a pH not greater than about 3.5 in the presence of a ceric salt which is soluble in at least one component of said aqueous emulsion, and an alumino-silicate substrate which is capable of being oxidized by said ceric salt and which is capable of initiating polymerization of said monomeric compound, wherein said substrate is a reducing agent for said reaction.

35. A process comprising polymerizing a monomeric compound containing a polymerizably reactive vinyl group dissolved at least partially in an aqueous emulsion at a pH not greater than about 3.5 in the presence of a ceric salt which is soluble in at least one component of said aqueous emulsion, and an alumino-silicate inorganic substrate which is non-swelling when in said aqueous emulsion, capable of being oxidized by said ceric salt and which is capable of initiating polymerization of said monomeric compound wherein said alumino-silicate inorganic substrate is a reducing agent for said reaction.

36. A process comprising polymerizing a monomeric compound containing a polymerizably reactive vinyl group dissolved at least partially in an aqueous emulsion at a pH not greater than about 3.5 in the presence of a ceric salt which is soluble in at least one component of the aqueous emulsion and a lattice-type inorganic substrate which swells and expands when in said aqueous emulsion, which is capable of being oxidized by said ceric salt and which is capable of initiating polymerization of said monomeric compound, wherein said lattice-type inorganic solid is a reducing agent for said reaction.

37. The process of claim 35 wherein the alumino-silicate inorganic substrate contains a three-layer lattice structure.

38. The process of claim 35 wherein the alumino-silicate inorganic substrate contains a two-layer crystalline structure.

39. The process of claim 35 wherein the alumino-silicate inorganic substrate contains a mixed layer structure.

40. The process of claim 35 wherein the alumino-silicate inorganic substrate contains a chain-like fibrous structure.

41. The process of claim 37 wherein the alumino-silicate inorganic substrate has a three-layer non-expanding lattice structure consisting essentially of illite.

42. The process of claim 38 wherein the alumino-silicate inorganic substrate contains a two-layer crystalline structure and is a member selected from the class consisting of kaolinite, nacrite, dickite, anauxite, halloysite and endellite.

43. The process of claim 38 wherein the alumino-silicate inorganic substrate has a two-layer crystalline structure consisting essentially of kaolinite.

44. The process of claim 38 wherein the alumino-silicate inorganic substrate has a two-layer crystalline structure consisting essentially of nacrite.

45. The process of claim 38 wherein the alumino-silicate inorganic substrate has a two-layer crystalline structure consisting essentially of dickite.

46. The process of claim 38 wherein the alumino-silicate inorganic substrate has a two-layer crystalline structure consisting essentially of anauxite.

47. The process of claim 38 wherein the alumino-silicate inorganic substrate has a two-layer crystalline structure consisting of halloysite.

48. The process of claim 38 wherein the alumino-silicate inorganic substrate has a two-layer crystalline structure consisting of endellite.

49. The process of claim 38 wherein the alumino-silicate inorganic substrate has a mixed layer structure consisting essentially of chlorite.

50. The process of claim 40 wherein the alumino-silicate inorganic substrate contains a chain-like fibrous structure and is a member selected from the class consisting of attapulgite, palygorskite and sepiolite.

51. The process of claim 40 wherein the alumino-silicate inorganic substrate contains a chain-like fibrous structure consisting essentially of attapulgite.

52. The process of claim 40 wherein the alumino-silicate inorganic substrate contains a chain-like fibrous structure consisting essentially of sepiolite.

53. The process of claim 40 wherein the alumino-silicate inorganic substrate contains a chain-like fibrous structure consisting essentially of palygorskite.

54. The process of claim 36 wherein the lattice-type inorganic substrate contains a three-layer crystalline structure.

55. The process of claim 36 wherein the lattice-type inorganic substrate is a member selected from the class consisting of smectite and vermiculite.

56. The process of claim 36 wherein the lattice-type inorganic substrate consists essentially of sauconite.

57. The process of claim 36 wherein the lattice-type inorganic substrate consists essentially of succinite.

58. The process of claim 36 wherein the lattice-type inorganic substrate consists essentially of vermiculite.

59. The process of claim 36 wherein the lattice-type inorganic substrate consists essentially of smectite.

60. The process of claim 36 wherein the lattice-type inorganic substrate consists essentially of nontronite.

61. The process of claim 36 wherein the lattice-type inorganic substrate consists essentially of saponite.

62. The process of claim 1 wherein the polymerizable monomeric compound is a member selected from the class consisting of styrene, ring-substituted styrene, and side-chain substituted styrene.

63. The process of claim 32 wherein the polymerizable monomeric compound is a member selected from the class consisting of styrene, ring-substituted styrene and side-chain substituted styrene.

64. The process of claim 1 wherein the polymerizable monomeric compound is a member selected from the class consisting of an acrylic acid, anhydride, amide and a nitrile.

65. The process of claim 32 wherein the polymerizable monomeric compound is a member selected from the class consisting of an acrylic acid, anhydride, amide and a nitrile.

66. The process of claim 1 wherein the polymerizable monomeric compound is an acrylic acid ester of the reaction of an acrylic acid with a member selected from the class consisting of monohydric and polyhydric alcohols.

67. The process of claim 32 wherein the polymerizable monomeric compound is an acrylic acid ester of the reaction of an acrylic acid with a member selected from the class consisting of monohydric and polyhydric alcohols.

68. The process of claim 1 wherein the polymerizable monomeric compound is a member selected from the class consisting of allyl alcohol, allyl esters and substituted allyl esters.

69. The process of claim 32 wherein the polymerizable monomeric compound is a member selected from the class consisting of allyl alcohol, allyl esters and substituted allyl esters.

70. The process of claim 1 wherein the polymerizable monomeric compound is a vinyl or vinylidene ester.

71. The process of claim 32 wherein the polymerizable monomeric compound is a vinyl or vinylidene ester.

72. The process of claim 1 wherein the polymerizable monomeric compound is a vinyl acetate.

73. The process of claim 1 wherein the polymerizable monomeric compound is a vinyl ether.

74. The process of claim 1 wherein the polymerizable monomeric compound is an unsaturated polymerizable amide.

75. The process of claim 1 wherein the polymerizable monomeric compound is acrylamide.

76. The process of claim 1 wherein the polymerizable monomeric compound is methacrylamide.

77. The process of claim 1 wherein the polymerizable monomeric compound is methacrylonitrile.

78. The process of claim 1 wherein the polymerizable monomeric compound is acrylonitrile.

79. A process for preparing graft copolymers comprising polymerizing a polymerizable monomeric compound conaining a polymerizable reactive vinyl group in an aqueous medium at a pH not greater than about 3.5 in the presence of a ceric salt which is soluble in at least one component of the reaction medium and an inorganic substrate having hydroxyl groups or which forms hydroxyl groups when in said aqueous medium, capable of being oxidized by said ceric salt and which is capable of initiating the polymerization of said monomeric compound, wherein said inorganic substrate is a reducing agent for said reaction.

80. A process for preparing graft copolymers comprising polymerizing a polymerizable monomeric compound containing a polymerizably reactive vinyl group in an aqueous medium at a pH not greater than about 3.5 in the presence of a ceric salt which is soluble in at least one component of the reaction medium, and an inorganic substrate having hydroxyl groups or which forms hydroxyl groups when in said aqueous medium, capable of being oxidized by said ceric salt and which is capable of initiating the polymerization of said monomeric compound, wherein the only reducing agent in the reaction medium is said inorganic substrate.

81. A process for preparing graft copolymers comprising polymerizing a polymerizable monomeric compound containing a polymerizably reactive vinyl group dissolved at least partially in an aqueous medium at a pH not greater than about 3.5 in the presence of a ceric salt which is soluble in at least one component of the reaction medium, and an alumino-silicate substrate which is capable of being oxidized by said ceric salt and which is capable of initiating the polymerization, wherein said alumino-silicate substrate is a reducing agent for said reaction.

82. A process for preparing graft copolymers comprising polymerizing a polymerizable monomeric compound containing a polymerizably reactive vinyl group dissolved at least partially in an aqueous medium at a pH not greater than about 3.5 in the presence of a ceric salt which is soluble in at least one component of the reaction medium, and an aluminosilicate inorganic substrate which is non-swelling when in said aqueous medium, which is capable of being oxidized by said ceric salt and which is capable of initiating polymerization of said monomeric compound wherein said alumino-silicate inorganic substrate is a reducing agent for said reaction.

83. A process for preparing graft copolymers comprising polymerizing a polymerizable monomeric compound containing a polymerizably reactive vinyl group dissolved at least partially in an aqueous medium at a pH not greater than about 3.5 in the presence of a ceric salt which is soluble in at least one component of the reaction medium, and a lattice-type inorganic substrate which swells and expands when in said aqueous medium, which is capable of being oxidized by said ceric salt and which is capable of initiating polymerization of said monomeric compound wherein said lattice-type inorganic substrate is a reducing agent for said reaction.

84. The process of claim 82 wherein the alumino-silicate inorganic substrate contains a three-layer lattice structure.

85. The process of claim 82 wherein the alumino-silicate inorganic substrate contains a two-layer crystalline structure.

86. The process of claim 82 wherein the alumino-silicate inorganic substrate contains a mixed layer structure.

87. The process of claim 82 wherein the alumino-silicate inorganic substrate contains a chain-like fibrous structure.

88. The process of claim 84 wherein the alumino-silicate inorganic substrate has a three-layer lattice structure consisting essentially of illite.

89. The process of claim 85 wherein the alumino-silicate inorganic substrate contains a two-layer crystalline structure and is a member selected from the class consisting of kaolinite, nacrite, dickite, anauxite, halloysite, and endellite.

90. The process of claim 87 wherein the alumino-silicate inorganic substrate contains a chain-like fibrous structure and is a member selected from the class consisting of attapulgite, palygorskite and sepiolite.

91. The process of claim 90 wherein the alumino-silicate inorganic substrate is attapulgite.

92. The process of claim 83 wherein the lattice-type inorganic substrate contains a three-layer lattice structure.

93. The process of claim 83 wherein the lattice-type inorganic substrate is a member selected from the class consisting of smectite and vermiculite.

94. The process of claim 83 wherein the lattice-type inorganic substrate is montmorillonite.

95. The process of claim 83 wherein the lattice-type inorganic substrate is vermiculite.

96. The process of claim 83 wherein the lattice-type inorganic substrate comprises bentonite.

97. A process for preparing graft copolymers comprising polymerizing a polymerizable monomeric compound containing a polymerizably reactive vinyl group in an aqueous emulsion at a pH not greater than about 3.5 in the presence of a ceric salt which is soluble in at least one component of the reaction medium, and an inorganic reducing agent having hydroxyl groups or which forms hydroxyl groups in said aqueous emulsion, which is capable of being oxidized by said ceric salt and which is capable of initiating polymerization of said monomeric compound, wherein said inorganic reducing agent is the only reducing agent for said reaction.

98. The process of claim 79 wherein the polymerizable monomeric compound is a member selected from the class consisting of styrene, ring-substituted styrene and side-chain substituted styrene.

99. The process of claim 79 wherein the polymerizable monomeric compound is a member selected from the class consisting of an acrylic acid, anhydride, amide, and a nitrile.

100. The process of claim 79 wherein the polymerizable monomeric compound is an acrylic acid ester of the reaction of an acrylic acid with a member selected from the class consisting of monohydric and polyhydric alcohols.

101. The process of claim 79 wherein the polymerizable monomeric compound is a member selected from the class consisting of allyl alcohol, allyl esters and substituted allyl esters.

102. The process of claim 79 wherein the polymerizable monomeric compound is a vinyl or vinylidene ester.

103. The process of claim 79 wherein the polymerizable monomeric compound is a vinyl acetate.

104. The process of claim 79 wherein the polymerizable monomeric compound is a vinyl ether.

105. The process of claim 79 wherein the polymerizable monomeric compound is an unsaturated polymerizable amide.

106. The process of claim 79 wherein the polymerizable monomeric compound is acrylamide.

107. The process of claim 79 wherein the polymerizable monomeric compound is methacrylamide.

108. The process of claim 79 wherein the polymerizable monomeric compound is acrylonitrile.

109. The process of claim 79 wherein the polymerizable monomeric compound is methacrylonitrile.

110. The process of claim 83 wherein the polymerizable monomeric compound is a member selected from the class consisting of styrene, ring-substituted styrene, and side-chain substituted styrene.

111. The process of claim 83 wherein the polymerizable monomeric compound is a member selected from the class consisting of an acrylic acid, anhydride, amide and a nitrile.

112. The process of claim 83 wherein the polymerizable monomeric compound is an acrylic acid ester of the reaction of an acrylic acid with a member selected from the class consisting of monohydric and polyhydric alcohols.

113. The process of claim 83 wherein the polymerizable monomeric compound is a member selected from the class consisting of allyl alcohol, allyl esters and substituted allyl esters.

114. The process of claim 83 wherein the polymerizable monomeric compound is a vinyl or vinylidene ester.

115. The process of claim 83 wherein the polymerizable monomeric compound is a vinyl acetate.

116. The process of claim 83 wherein the polymerizable monomeric compound is a vinyl ether.

117. The process of claim 83 wherein the polymerizable monomeric compound is an unsaturated polymerizable amide.

118. The process of claim 83 wherein the polymerizable monomeric compound is acrylamide.

119. The process of claim 83 wherein the polymerizable monomeric compound is methacrylamide.

120. The process of claim 83 wherein the polymerizable monomeric compound is acrylonitrile.

121. The process of claim 83 wherein the polymerizable monomeric compound is methacrylonitrile.

122. The process of claim 97 wherein the polymerizable monomeric compound is a member selected from the class consisting of styrene, ring-substituted styrene, and side-substituted styrene.

123. The process of claim 97 wherein the polymerizable monomeric compound is a member selected from the class consisting of an acrylic acid, anhydride, amide and a nitrile.

124. The process of claim 97 wherein the polymerizable monomeric compound is an acrylic acid ester of the reaction of an acrylic acid with a member selected from the class consisting of monohydric and polyhydric alcohols.

125. The process of claim 97 wherein the polymerizable monomeric compound is a member selected from the class consisting of allyl alcohol, allyl esters and substituted allyl esters.

126. The process of claim 97 wherein the polymerizable monomeric compound is a vinyl or vinylidene ester.

127. The process of claim 97 wherein the polymerizable monomeric compound is a vinyl acetate.

128. The process of claim 97 wherein the polymerizable monomeric compound is a vinyl ether.

129. The process of claim 97 wherein the polymerizable monomeric compound is an unsaturated polymerizable amide.

130. The process of claim 97 wherein the polymerizable monomeric compound is acrylamide.

131. The process of claim 97 wherein the polymerizable monomeric compound is methacrylamide.

132. The process of claim 97 wherein the polymerizable monomeric compound is acrylonitrile.

133. The process of claim 97 wherein the polymerizable monomeric compound is methacrylonitrile.

* * * * *